March 31, 1964  D. KATZ  3,127,330

PROCESS AND APPARATUS FOR OBTAINING FRESH WATER FROM THE SEA

Filed Oct. 27, 1961  7 Sheets-Sheet 1

INVENTOR

David Katz.

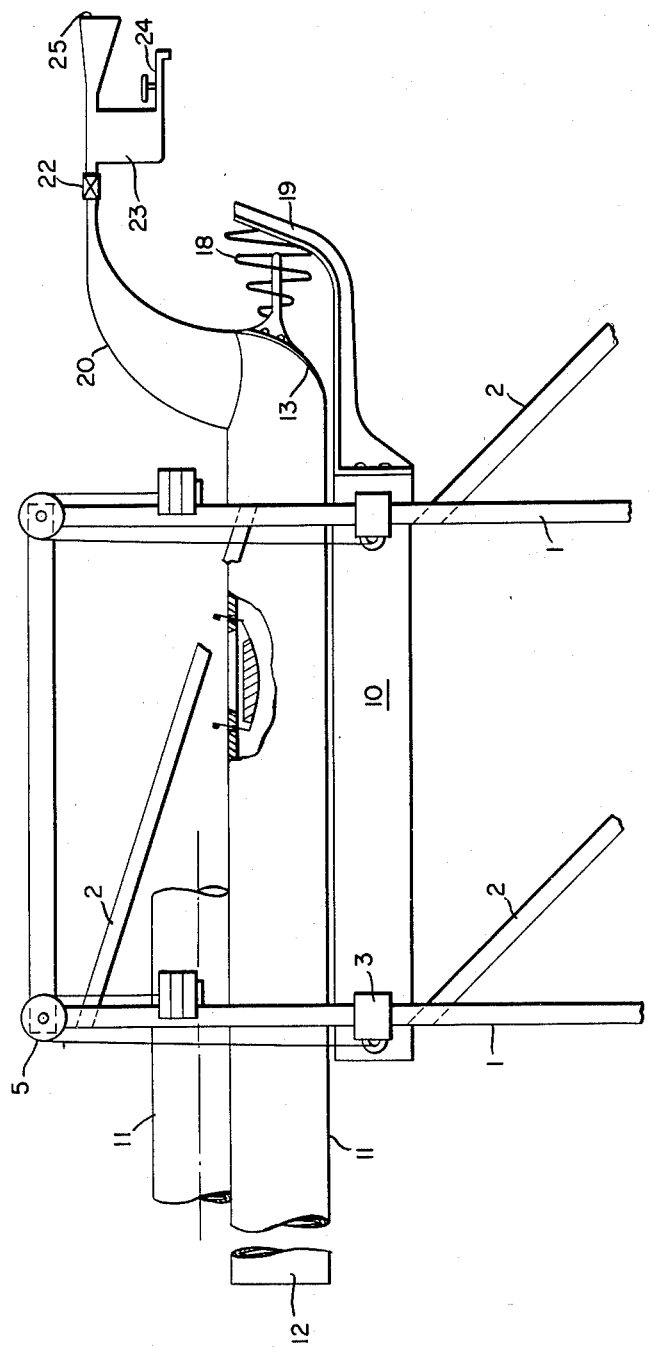

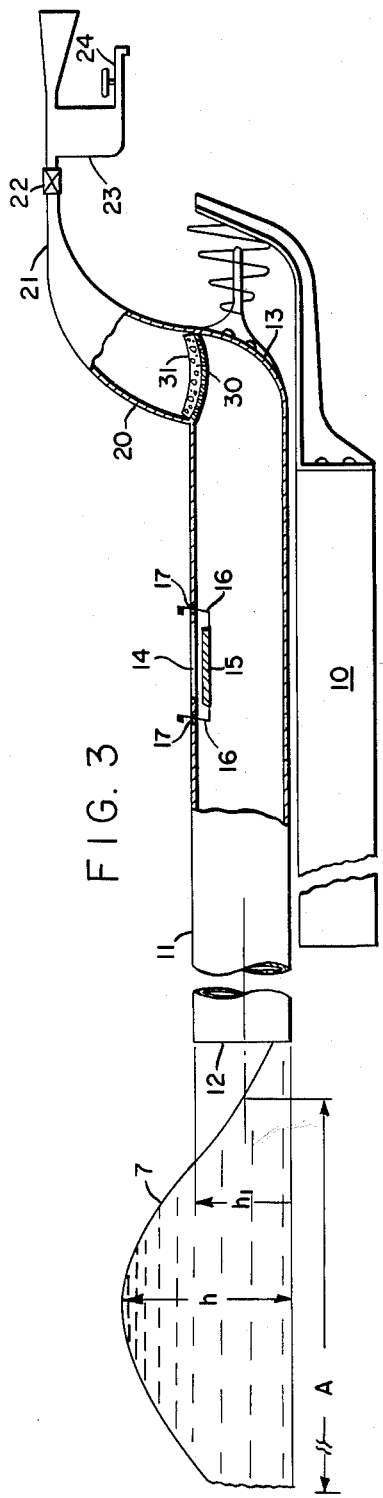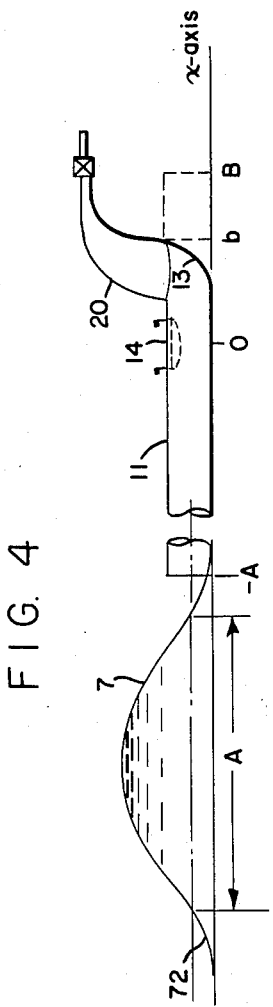

INVENTOR
David Katz

March 31, 1964 D. KATZ 3,127,330
PROCESS AND APPARATUS FOR OBTAINING FRESH WATER FROM THE SEA
Filed Oct. 27, 1961 7 Sheets-Sheet 5

INVENTOR
David Katz.

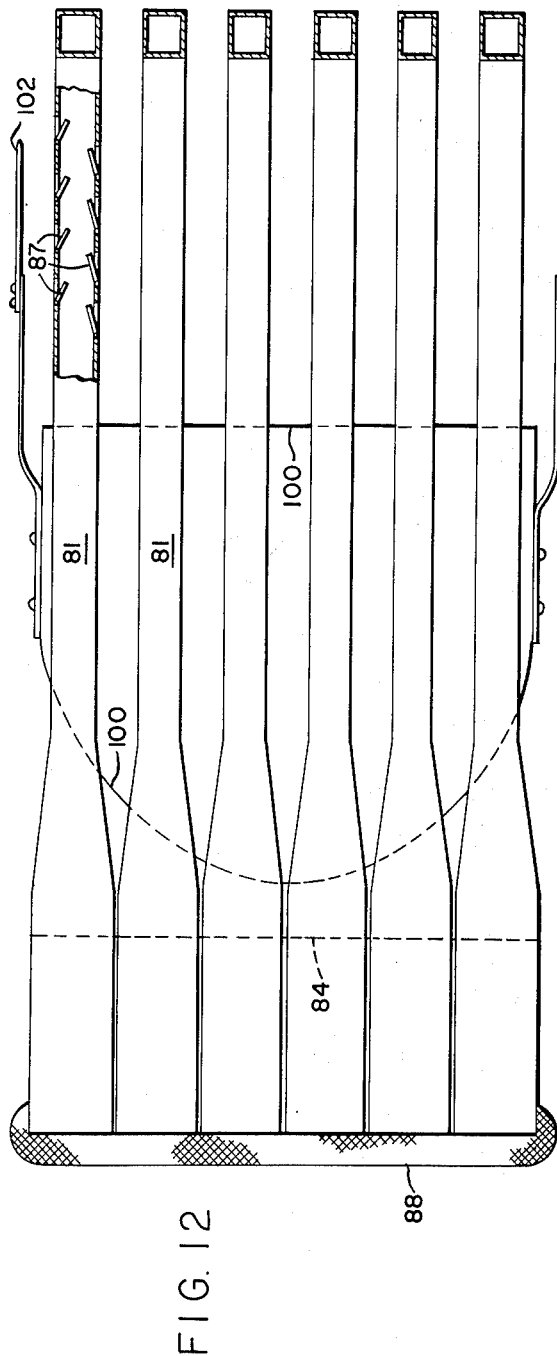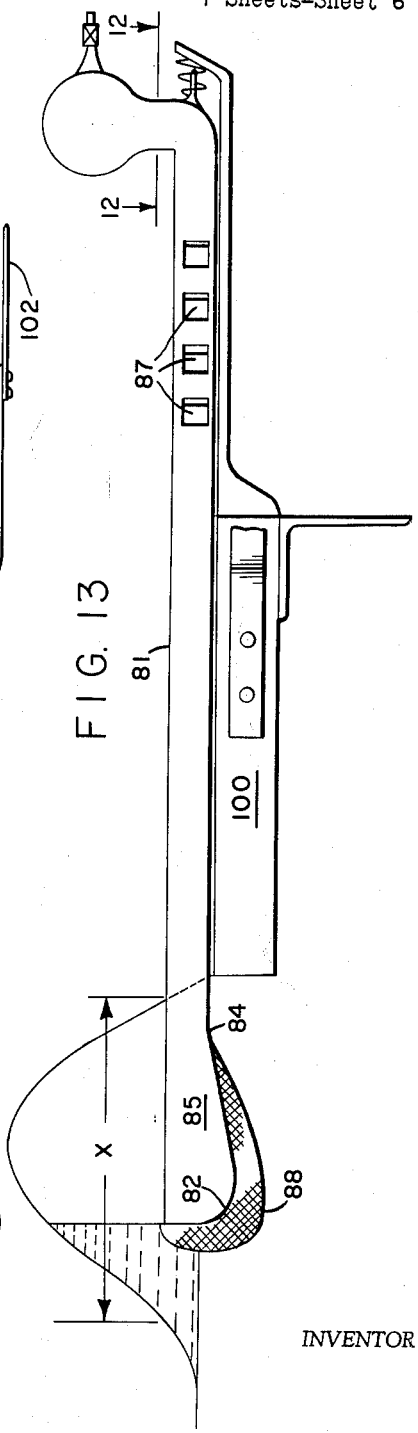

United States Patent Office 3,127,330
Patented Mar. 31, 1964

3,127,330
PROCESS AND APPARATUS FOR OBTAINING
FRESH WATER FROM THE SEA
David Katz, 506 W. 35th St., Wilmington 2, Del.
Filed Oct. 27, 1961, Ser. No. 148,159
8 Claims. (Cl. 202—46)

This invention relates to the problem of recovering salt-free water from the sea.

It is an object of this invention to provide a novel method and apparatus for obtaining fresh water from the sea, whereby to achieve the following side benefits: Obviating the need for continually expending energy-providing raw material (e.g. coal, oil or fissionable matter) in proportion to the quantity of water recovered; providing an apparatus which can be adapted both for use on a large, industrial scale and for the needs of an individual farmer or home owner located by the sea shore; providing an apparatus which will require little or no supervision, once installed. Various other objects and achievements of this invention will become apparent as the description proceeds.

The problem of obtaining sweet water from the sea has been tackled heretofore from almost every conceivable angle. Numerous physical and physico-chemical methods have been investigated, including such diverse approaches as distillation, precipitation, ion-exchange, electrolysis, adsorption or resins, etc. But all approaches hitherto had apparently been confined to the use of sea-water as the raw material.

This invention approaches the problem from an entirely new angle, and proposes to recover drinkable water, not from sea-water, but from the air above the sea.

While the above statement may sound fantastic at first, it becomes entirely logical when one considers that the air above the sea, at least in the layers immediately above the surface of the water, are of necessity essentially saturated with moisture, which however is not laden with salts. Moreover, by the methods more fully developed hereinbelow, I propose first to increase the water content of the air, and then to compel the latter to return the increase, perhaps also with a good fraction of its original water content.

More specifically, this invention contemplates increasing the water-content of the air above the sea by compressing the same in a heat-insulated apparatus (hence, adiabatically) in contact with sea water.

Leaving mathematical investigation and demonstrations to later chapters in this discussion, it will be observed at this point that adiabatic compression of a gas (in absence of liquid) raises its temperature to astounding heights. For instance, compression of dry air from an original volume $v$ to $\frac{1}{3} v$ under adiabatic conditions and at an original temperature of 20° C., will raise its temperature to 182° C. If the compression is to $\frac{1}{5} v$, the final temperature will be 285° C. (IV–1)

NOTE: Numerals in parentheses refer to Part IV—Computations—at the end of this specification.

Obviously, if the compression is made in the presence of water, considerable quantities of the latter will evaporate. The increased quantity of moisture in the air, will increase its pressure. Considering the classical gas formula $pv = nRT$, we have now a situation where not only T but also $n$ increases. Consequently, T will not rise to the same heights as before; so that as we go from $v_1$ and $T_1$ to $v_2$ and $T_2$, where $v_2 = \frac{1}{3} v_1$, part of the pressure in the gas will be supplied by the higher T, and part by the increase in $n$.

The mathematical analysis of this problem starts with the basic assumption that the work W done by an outside agency (say, the wave) in compressing a given volume $v_1$ of humid air to a final volume $v_2$ (in presence of moisture) must be equal (in proper energy units) to the sum of the following two terms:

$L\Delta x$, which expresses the heat energy required to vaporize the increased quantity of water, and $nC\Delta T$, which expresses the heat energy required to raise the entire gaseous mixture from temperature $T_1$ to temperature $T_2$.

Since the pressure against which the external force works increases continuously from $p_1$ to $p_2$, since the quantity of water vapor in the confined space rises from $x_1$ to $x_2$, and since the temperature rises continuously from $T_1$ to $T_2$, the setting up of this equation requires much wordage and detail, and the mechanics of solving it are not simple. Suffice it therefore to state that the relations formulated under III–1 in Part III below and tabulated in Part III–3 represent, with a high degree of accuracy, the solution to the above postulated basic equation. These formulas and table, for instance, indicate that if air be compressed adiabatically in the presence of ample water, starting with an original volume $v_1$ at 20° C. and ending up with a volume $v_2 = \frac{1}{3} v_1$, the water-content of the air will increase from 0.0215 mole per original mole-volume (i.e. per 22.4 liters of original volume) to 0.0657; the temperature on the other hand rises only to 64.7° C. If the compression is to $\frac{1}{5} v_1$, the final water content is 0.0889 mole per original mole-volume and the temperature is about 85.6° C.

Now suppose we pass this moisture-enriched, compressed air through an expanding valve (a "throttle"). As is well known from classical teachings, the air will cool. Its capacity to hold moisture will drop. And just at the exit of the throttle, liquid water will be precipitated in an amount corresponding to the difference between $n_2$ and $n_1$. (0.0657 — 0.0215 in the first instance; 0.0889 — 0.0215 in the second instance.)

If the said compression is done in a cylinder of initial volume of about 28.3 cu. ft. (say, 3 ft. in diameter and 4 ft. long), which corresponds to a $v_1$ of about 36 mole-volumes (IV–3), then with each compression-expansion cycle there will be obtained about 28.6 and 43.6 cc. of fresh water in the two cases, respectively (IV–4). Furthemore, with proper design of the throttle, one may succeed in dropping the temperature of the expanded air to below 20° C. In such event, the final content of the emerging air will be less than 0.0215 per mole-volume, and the quantity of water recovered will be accordingly greater.

But now, what about the power required for compressing the air? According to a further feature of this invention, it is proposed to derive this power directly from the waves associated with the surface of the sea.

Before proceeding further with the development of this topic, reference is hereby made to the drawings which accompany this specification and constitute an integral part thereof. In these drawings—

FIG. 2 is a side view of the same installation.

FIG. 3 is a side view, partly in vertical section, of one of the tubes which constitute the basic operating elements in this invention. FIG. 4 is a diagram showing how the dimensions of the tube, used in the form of algebraic symbols in the computations below, are laid off on the tube and also on a surface wave which approaches this tube.

FIG. 12 is a top view, in diagrammatic form, of the entire assembly of pontoon and plurality of tubes, which may be chosen as a unit of this invention for small scale operation. This view is partly in section, taken along line 12—12 of FIG. 13. FIG. 13 is a side view of the same assembly.

Figure 14:
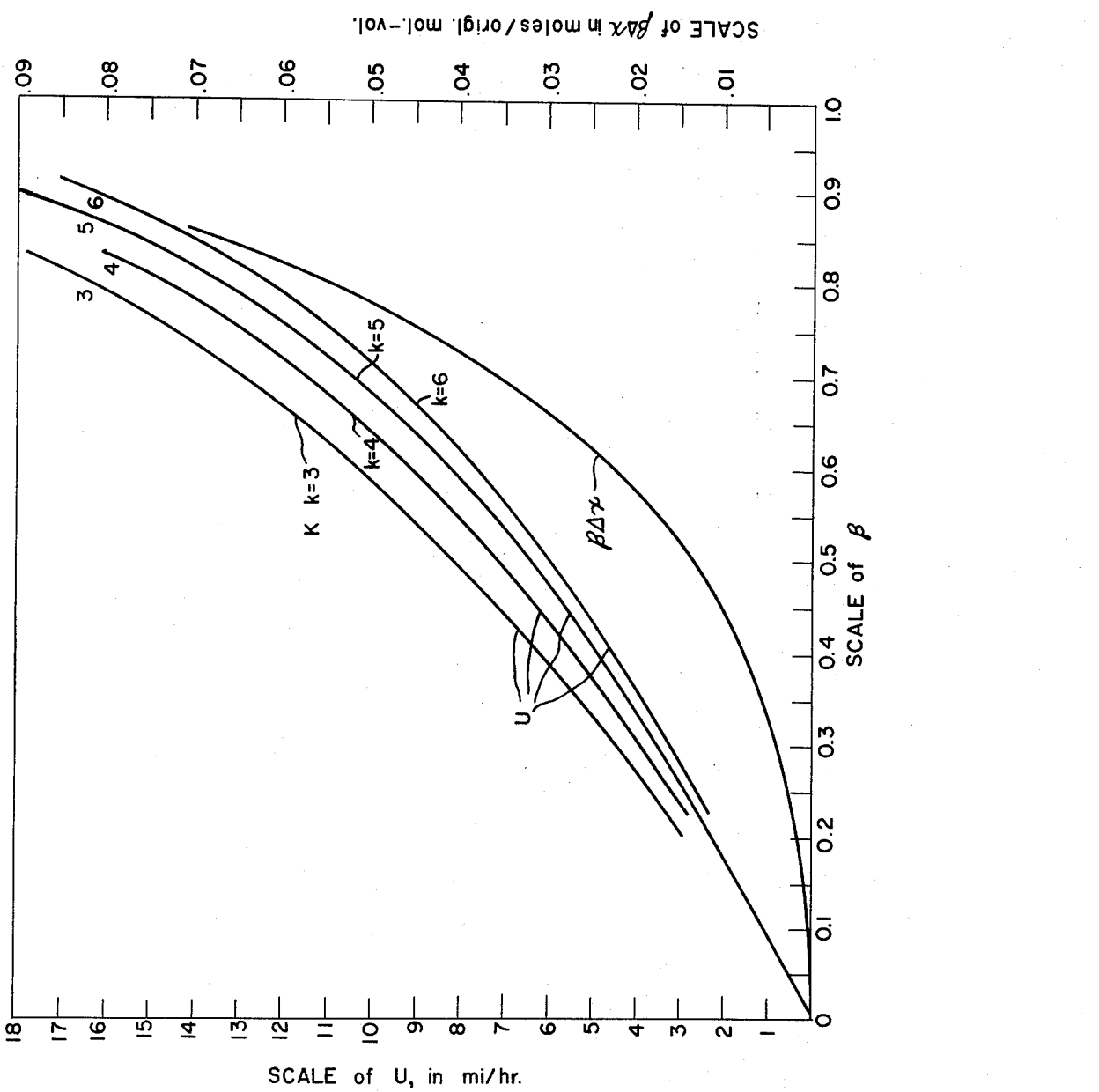

FIG. 14 comprises a group of graphs which have been computed by me to assist in the mathematical calculations required in estimates and in engineering design of the apparatus embraced in this invention.

Returning to the discussion of the theory of my invention, let us first consider an apparatus which is installed near the shore and is intended to be operated by the surf, that is, the tide-type waves which are formed close to the seashore by the spillover from the breakers.

PART I.—UTILIZING THE SHORE-WAVES OR "SURF"

Figure 1:
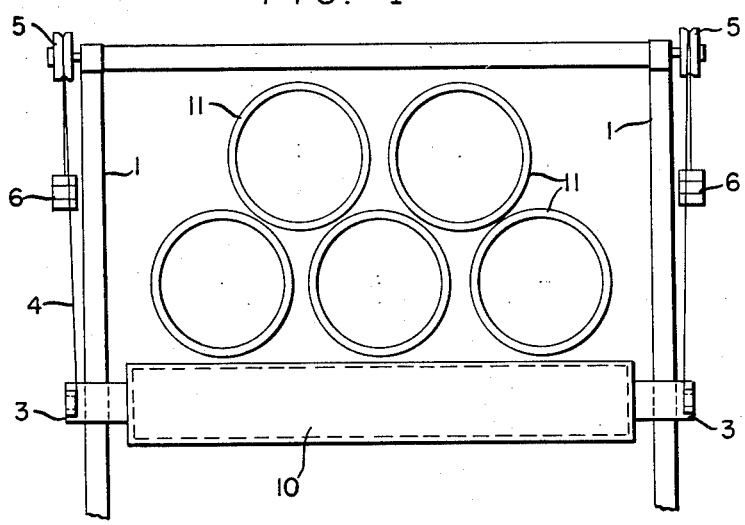
FIG. 1 is a front view of an installation according to this invention which is particularly adapted for service in the surf area, near the seashore.

In FIGS. 1 and 2 is shown a steel framework or "cradle" having vertical posts 1, 1, properly braced by cross members and slanting members 2, 2. The cradle may be 10 or 20 ft. wide (lengthwise of the shore) and 20 to 50 ft. long (in the dimension at right angles to the shore line). Its posts 1, 1 may be driven permanently into the bed of the sea, or, on the contrary, may be supported on heavy rollers so as to permit a tug boat to shove it further into the sea or back, closer to the shore, as needed. Between the posts of the cradle, a float 10 of wood (or hollow steel "mattress") floats on the surface of the water, but is adapted to move up and down on the posts 1, 1 by the aid of channels or guides 3, 3. Steel ropes 4, 4 passing over pulleys 5, 5 are attached to the guides 3, 3, and carry on their ends adjustable weights 6, 6, to balance the excess weight of the float and its load, so that it will easily rise and fall with the tides. In this manner, its upper surface can be made to be substantially flush at all times with the troughs of the waves 7 coming in from the sea (FIG. 3).

The float 10 carries (slidably lengthwise thereof) a number of long horizontal barrels or cylinders 11, 11, which may be, say, 3 feet in diameter and 20 to 50 or even 100 feet long. These barrels may be built of steel or wood, but, obviously, should be designed to withstand high stress of impact. They should abut through a heavy spring 18 against a sturdy extension 19 of the float. Each cylinder has an open end 12 which faces the oncoming wave, but is closed or rounded off at the rear end 13. In view of the vertical mobility of the float, all the barrels will lie in planes above the trough level of the water, but are sufficiently close to it to intercept and be filled by the oncoming surf. (This is true at all times of the lower row of cylinders, but may not be true at all times of the second and higher rows, if there are any.)

Further details of the horizontal cylinders are given in FIG. 3. Assuming the full length of the horizontal cylinder to be 20 or 30 feet, there is a wide opening 14 in the top side thereof, whose forward edge is about 4 to 6 feet (more or less) from the closed end of the cylinder. Underneath the opening is a cover 15 of wood or other floating material, which hangs a few inches below it, on straps 16 sliding through inclined grooves 17 in the roof of the horizontal cylinder. The cover 15 is designed so as to close the opening 14 with a good (but not jamming) fit when raised into position. Also, when in this position, its lower surface (bevelled off and smoothened) should offer as little resistance to the flow of water as possible.

Again in the top of each cylinder, just above the rounded end 13 is a sturdy, steel chimney or gooseneck 20, wide at the bottom but narrowing and curving on top into narrow, horizontal or downwardly inclined pipe 21, which itself serves as a throttle or contains a special constriction valve 22. Beyond the throttle, the pipe carries a sump 23 for capturing any condensed water and from which the latter may be drained off through outlet 24. The horizontal pipe 22 continues for some distance beyond the sump, and ends in an open trumpet end 25 for discharge of the decompressed air.

The chimney 20 is separated from the main body of the cylinder by means of an upwardly concave, sturdy grating 30, on top of which rests a sponge or foam rubber pad 31. The latter is preferably perforated through its thickness in many places in such a manner that when the sponge is bent upwards by air- or water-pressure from below, the perforations become open and will transmit air or water upwards. When, however, it falls back into the concave grating (due to pressure from above) the perforations close up due to the curving and jamming of the spongy material.

The chimney 20 is designed so that its volume from the spongy pad to the throttle is a small fraction, say $\frac{1}{3}$ to $\frac{1}{5}$, of the total volume comprised in the chimney and cylinder space, starting from throttle 22 backwards, through the grating 30, and back to about the midpoint of the top opening 14. This total volume will be referred to hereinafter as $v_1$, or the initial air volume being compressed.

The operation of the cylinder is as follows: Referring to FIG. 4, a wave of average horizontal width A (say 30 feet) at the level of the axis of the cylinder approaches and enters the mouth of the horizontal cylinder. As it progresses along this channel, the air within the latter escapes through the opening 14, which is relatively wide at the forward end. This involves no loss of energy to the wave, for even if the air within the cylinder has to push back the atmosphere as it emerges through opening 14, this work is fully compensated by the atmospheric pressure at the rear 72 of wave 7. This process continues until the forward end of the wave reaches about the middle of suspended cover 15, at which point the latter slams shut against the opening and entraps all the remaining air within the cylinder. Compression begins at this point; and for this reason, we draw a horizontal axis below the cylinder, and mark this point $x=0$. The initial volume of air $v_1$ to be taken into account in computations from this point on is the volume contained within the end of the pipe and the chimney above it, from the point $x=0$ up to throttle 22. To facilitate computation, we construct diagrammatically an imaginary extension of the pipe or cylinder, at uniform cross-section $a$, up to some point $x=B$, to replace the volume of the chimney; then $v_1=aB$.

As the wave continues its motion, the pressure inside the pipe rises; the wave loses energy, and the process continues until at some point $x=b$, very close to the end of the actual cylinder, the volume of water comes to a momentary rest. At that point the entire initial energy of the wave mass of length A and cross-section $a$ has been expended in compressing the entrapped air to pressure $p_2$, heating it to temperature $t_2$, and evaporating enough water to saturate the entrapped air at temperature $t_2$. As the pressure rises, the spongy pad 31 is lifted from its seat, its pores and perforations open up, and the compressed air finds its way into the space within the chimney. Under certain conditions, the water may also rise above the level of grating 30, but in any event, there will probably be sufficient splash and spray to make the spongy pad saturated with water with each blow of the "water-hammer."

As soon, however, as the maximum compression has been reached, the wave begins to recede. The upward pressure against pad 31 drops, while the pressure within the chimney forces it air-tight against the grating 30. The air entrapped in the chimney compartment has no escape except through the throttle 22. This it proceeds to do while the wave is receding and, by proper design of the apparatus, all this action is completed before the next wave-front hits the mouth of the tube. As the receding water clears the cover 15, the latter drops, and the apparatus is now in a position to repeat the cycle.

The total energy spent in one wave hit is $\frac{1}{2}mU^2$, where $U$ is the velocity of the water-wave (in cm./sec.) and $m$ is its mass in grams. In its turn, $m=aA\delta$, where $a=$cross-section of the pipe, $A=$the average width of the wave (if it is entirely within the pipe, or else $A$ is the distance from point $x=b$ rearwards to the open end of the pipe), while $\delta$ is the density of the water. For sea water, $\delta$ is generally about 1.025 or 41/40. If $U$ is 8 miles per hour, $A=30$ feet, and the diameter of the pipe is 3 feet, the total energy is about $39.4 \times 10^{10}$ ergs. (IV–5). If this were applied to adiabatic compression of an equal volume of air in the absence of water, it would result in a $p_2$ of about 1.095 atm. (IV–6). But if we concentrate the above energy on a smaller volume of air, for instance if we assume that B is 5 feet, $a$ being the same as above ($9\pi/4$ sq. feet), and if we compress in contact with sea water, it can be shown (IV–7) that the above energy is sufficient to evaporate about 0.024 mole of water per initial mole-volume of entrapped air. If we further assume that upon throttling we collect 80% of the amount of water which had evaporated during compression, we obtain about 15.5 cc. of water per wave, per cylinder.

If we assume that the entire length of the wave (crest to crest) is 90 feet, then at 8 mi./hr., there will be about 8 waves hitting the tube per minute. If this condition continues for 16 hours out of every 24, the yield of water per day would be 119 liters per cylinder (IV–8). If we have a band of 3 cylinders, and if the two upper cylinders may be taken as delivering each ⅔ of the yield of each lower cylinder (due to the shorter value of A), the total yield per day must be multiplied by 4⅓, which results in 515 liters per day, or about 136 gallons (IV–9).

Obviously, these figures cannot be taken as typical. What constitutes a typical average can be determined only after theoretical and experimental study at each locality in view of the very high variability of such magnitudes as $U$ (the velocity of the wave), $A$ (its width at the level of each cylinder), the ratio between B and A, the temperature of the water and air above it, the persistence or length of persistence of any of these factors throughout the cycle of the day, and finally, the design of the throttle and the degree to which it succeeds in dehydrating the expanding air.

But the above tentative example does bring out the inherent logic of this invention and may serve as a guide for making computations and estimates for other necessary or desirable types of design.

Figure 6:
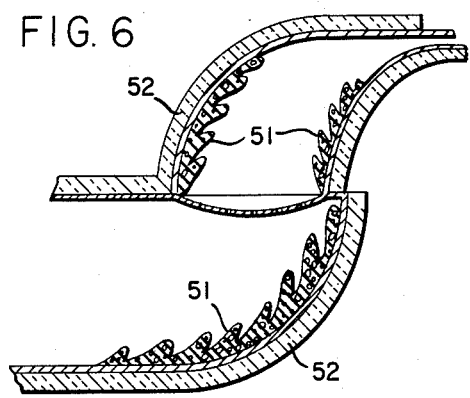
FIG. 6 is a detail, in vertical section, of a preferred construction of the tube in the region of highest air compression, showing in particular its external lagging and an internal spongy lining.

It will be understood, of course, that the basic theory above may be augmented with practical improvements and details, as will be readily apparent to those skilled in the art. Thus, the outer surface of each cylinder or tube 11, particularly in the regions of compression, should be "lagged" (coated with heat-insulating material) as shown at 52, 52 in FIG. 6, for the purpose of achieving as nearly adiabatic compression as possible. The inside, on the other hand, again near the closed end, may be lined with heavy layers or chunks of sponge, spongy rubber, etc., preferably having many upward pockets as shown at 51 in FIG. 6. Such spongy bodies, will become full of water and bulge out as the wave recedes. Then, as the next wave comes in and the pressure rises rapidly, the sponges will become compressed and squirt their water content in various directions into the rapidly diminishing space. The result will be to fill said space with sprays, splashes and droplets, thereby insuring complete saturation of the compressed air with water-vapor in the short interval that it is permitted to exist.

The spongy pad in the goose-neck may be replaced by upwardly swinging doors 32, 32 (FIG. 7) or any other form of a one-way valve.

The goose-neck should preferably be large enough in volume to hold the entire compressed air-volume. If need be, some water should be allowed to get inside the goose-neck rather than excluding some of the compressed air.

If $\Delta X$ is the quantity of vaporized water added to the compressed volume of air by the adiabatic compression, the chimney design of FIGS. 2 and 3 can at best deliver only about ½$\Delta X$ in the form of liquid water into the sump. This is so, because as air escapes through throttle 22, the pressure inside the chimney drops. Therefore, only the first few gusts of air are decompressed from level $p_2$ to $p_1$. The final few gusts expand from a level only a little above $p_1$.

Figure 7:
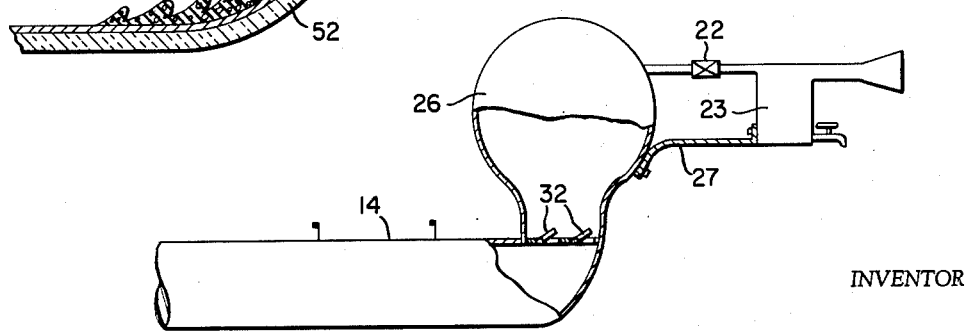
FIG. 7 is a diagrammatic vertical section of a modified form of the basic tube, particularly near its active compression-end.

To partially remedy this low efficiency of recovery, the goose-neck 20 may be replaced by a large, pear-shaped member 26 of a volume 4 or 5 times that of the compressed air, as indicated in FIG. 7. The throttle 22, on the other hand, should be designed or adjusted to let out in each period between successive waves a mass of the compressed air just about equal to the original mass in volume B. In this fashion, the air pressure inside the goose-neck will not drop down to $p_1$ in each cycle. Instead, it may swing between $p_2$ and, say, $p_2-\frac{1}{3}\Delta p$ or $p_2-0.20\Delta p$, so that a greater fraction $\theta$ of its $\Delta X$ content will be recovered in each cycle.

(27 is merely a brace to add support to sump 23.)

Figure 5:
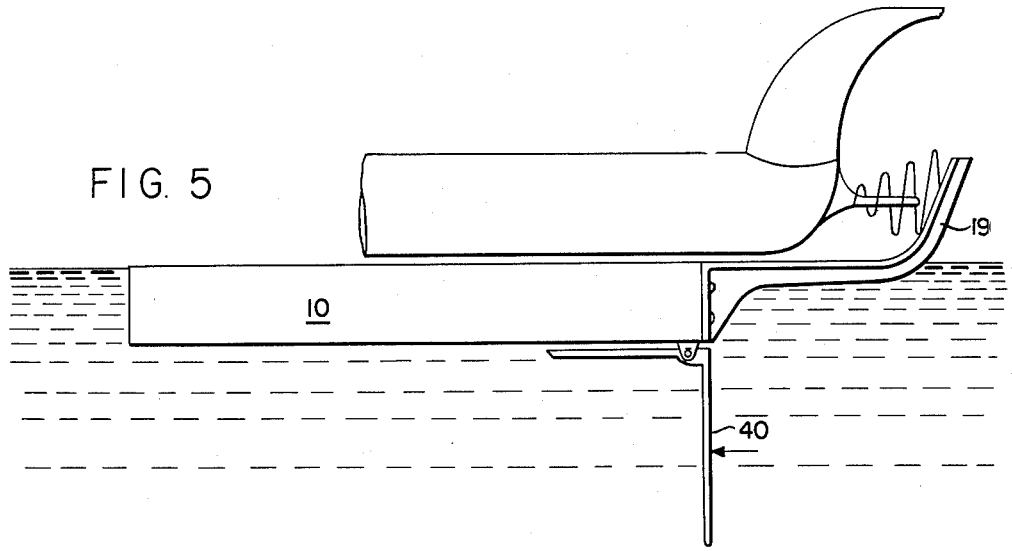
FIG. 5 is a side view of the floating support which holds the plurality of tubes shown in FIG. 1.

The mattress 10 itself may be provided with vertical, flow-resisting plates 40, dipping downwardly into the water (FIG. 5), so as to stabilize the mattress against rearward motion under the thrust of the water hammers.

PART II.—WIND-WAVE UTILIZATION

The discussion in Part I concerned itself mainly with waves very near the short, and has been treating them as if they were tidal waves. Indeed, surf does to some extent possess tidal characteristics, that is the water particles in it have a substantial translational motion. (Bigelow and Edmondson, Wind Waves at Sea, Breakers and Surf, H.O. Pub. No. 602, page 115.) But there may be localities where the translational waves developed by the breakers do not have either the height or the velocity to operate efficiently an apparatus as in FIGS. 1 to 6. Accordingly, a modified form of apparatus is indicated in FIGS. 8 to 13, which is designed to make use of wind waves, i.e. waves in the sea before they reach the breaking point.

Wind waves differ from tidal waves in that they have no steady horizontal velocity of value $U$. Their horizontal motion is an optical illusion. The water particles move in vertical circles, and it is the disturbance that is propagated forward with a velocity $U$. The problem requires a different mathematical approach, but the energy is there and can be utilized. Accordingly, let us now consider the practical changes needed in the proposed device to adapt it for using wind waves.

Firstly, the apparatus is taken out farther into the sea; perhaps 50 to 100 feet off shore. The depth of the water at such a spot may be 10 to 20 feet or more. If the depth becomes too great for simple posts to be driven into the sea bottom for holding the mattress as in FIGS. 1 and 2, they may be replaced by masts mounted on floating pontoons which in turn are anchored to the bottom of the sea.

Figure 8:
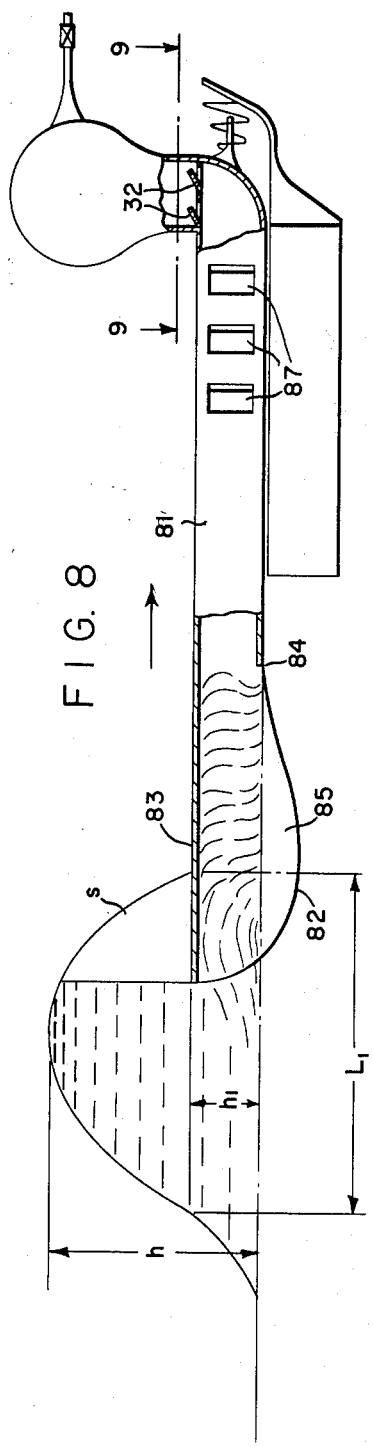
FIG. 8 is a diagrammatic side view of a modified assembly of basic tube and support, which is adapted particularly for use at some distance from the shore, where wind waves are prevalent.

Secondly, the round tubes 11 of FIGS. 1, 2, whose front ends 12 are perpendicular sections and lie in vertical planes are now replaced by tubes or channels of rectangular cross section and of a side view as shown in FIG. 8. That is, they consist of a full tube body 81 of substantial length (say 75 to 90 feet long), and, say, 3 feet high and 2 feet wide, in which however the open end 82 is slanting, the roof extending seawards much farther than the bottom of the channel. For instance, the roof 83 over the mouth of the tube may be fully 75 or 90 feet farther out than the chin (point 84), while the cheeks 85 extend along a curving (or slanting) line 82 (FIGS. 8 and 13) from the chin to the front edge of the roof.

Figure 9:
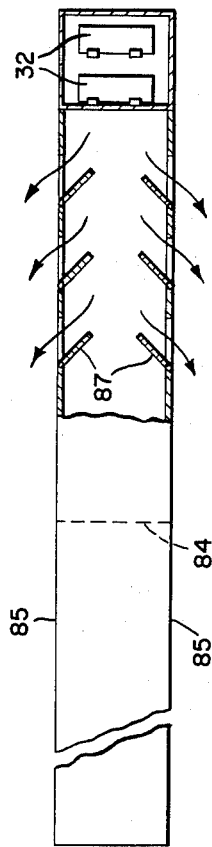
FIG. 9 is a partial section taken along 9—9 of FIG. 8 and shows one of the basic tube elements employed in FIG. 8; it shows in particular the details of the provisions for discharging the water from the wave which had entered the tube, after it has done its work.

The remainder of the apparatus is essentially as in Part I except that in view of the great length of the tube, it may sometimes be more than ½ the length of the wave striking it. Consequently, we can no longer depend on the tube emptying itself during the period when the trough of the wave passes under the mouth of the tube. Accordingly, ports or "gills" 87, 87 are provided on both sides of the tube close to the zero point of the compression area. These ports are provided with valve-type covers or doors which shut automatically as the water-hammer advances and open automatically when it recedes, (FIG. 9).

The theory behind this modification demands careful analysis. But as an elementary guide the following summary thereof is presented.

A wind wave does not possess kinetic energy of the order of $\frac{1}{2}mU^2$, if U is the velocity of propagation, because the water particles do not move forward (with a velocity U), at least not for any appreciable distance. The best way to analyze the energetics of a wind wave is to think of a spring welling up in the flat surface of the sea with the special peculiarity that the spring itself moves forward with a velocity U. The welling up water has kinetic energy in an upwards direction, which is sufficiently strong to support a column of water equal to the height $h$ of the wave (FIG. 8). In other words, the upward kinetic energy at the zero level of the wave is converted into potential energy at the crest.

As the moving well reaches the zone under the roof of the slanting channel mouth 82, its upward thrust finds itself suddenly arrested by the roof 83. The surging water then spills over to the right (the path to the left being blocked) and the quantity of the spill-over increases as the welling spring progresses to the right. Eventually, all the water that would have formed the top of the wave in FIG. 8 above level $h_1$, becomes transformed into a forwardly moving horizontal slug of length A inside the channel. Moreover, the entire potential energy that would have been stored in the mentioned top of the wave (except for such as is lost in eddy currents, friction, etc.) becomes converted into kinetic energy of the continuously accelerated horizontal slug. Eventually, the slug of length A has a mass and horizontal velocity which may be expressed by $\frac{1}{2}mU^2$, and which is just about equal to the potential energy that would otherwise have been stored in said wave cap above the level $h_1$.

We can calculate A from the height $h$ and length L of the wave and from the height $h_1$ at which the roof of the channel cuts the wave. We can calculate $m$ from the density of sea water, the height and width of the channel and the length A. We can calculate the potential energy of the cap which has been converted into kinetic energy. Finally, we can calculate the resultant U, and from here on we can use all the graphs and formulas developed in Part I for computing the quantity of water obtainable from each wave. (See Part III.)

To illustrate the procedure, assume that we have a wind wave 6 feet high and 102 feet long (Big. and Ed., page 30, Table 13). Then $h=183$ cm. From Formulas III–9 (in Part III), $U^2=1380\times183=252,000$; $U=502$ cm./sec.=11.23 mi./hr.

If we select a tube 2 feet high, $j$ is ⅓, $L_1$ is 62 feet, and A is 77 feet. If the tube is made long enough to accommodate this length of A, and to give it a compression chamber of length $B=15$, then $k$ is about 5.

Then, from the graph in FIG. 14, and from the mentioned U-value, $\beta$ is about 0.73, and $\beta\Delta x=0.0404$.

Assuming now that the width of the tube is 2 feet, $v_1=15\times2\times2=60$ cu. ft.=76 mol. vol. Assuming further a $\theta$-value of 0.80 (recovery coefficient), the quantity of water recovered per wave will be:

$$0.80\times76\times0.0404=2.46 \text{ mols.}=44.3 \text{ cc.}$$

According to Bigelow and Edmondson (ibid., page 32), the period T of a wave is a function of the square root of its length L. Developing the formulas there indicated, we obtain for the frequency of a wave, $$n=\frac{2.26}{\sqrt{L}} \text{ per second}$$

The number of waves per hour, then, will be $N=3600n$. Therefore, if $L=102$ $$N=\frac{3600\times2.26}{\sqrt{102}}=806 \text{ waves}$$

Thus, each unit that is 2 feet high and 2 feet wide, will yield per hour:

$$806\times44.3 \text{ cc.}=36 \text{ liters, when } h=6 \text{ feet}$$

With the same tube, if a 9 foot wave hits it, the yield of water per wave will be immensely larger, perhaps twice as large, because of the smaller value of $j$.

We may assume that the 6 foot waves can be depended on for 24 hours a day, while those of higher values of $h$ will occur perhaps only half of the time. On the average, therefore the specified apparatus will yield from 860 to, say, 1200 liters per day, or from 225 to 310 gallons.

If a bank of 6 such tubes are placed in parallel on the same pad or "mattress," the entire assembly or "mill" may be expected to yield some 1800 gals. of fresh water per day.

It will be noted that the vertical posts 1, 1 are not essential in the modification for utilizing wind waves (FIGS. 8 and 9), inasmuch as the tubes 30, 30 may be placed directly on the deck of the pontoon, and the latter may be weighted with suitable ballast to make the deck just about flush with the troughs of the incoming waves. On the other hand, it is desirable to make the entire assembly adjust itself automatically to any change in the direction of the waves, so as to have the mouths of the tubes or channels 81 directed always perpendicularly to the wave front. To this end, a pontoon structure as suggested in FIGS. 10 and 11 is recommended.

The front end 101 of the pontoon 100 is preferably rounded, and at the rear end of the pontoon are provided two vertical fins 102, 102, which extend vertically partly above the level of the pontoon deck and partly below it. These fins are preferably spaced somewhat laterally from the vertical sides of the pontoon, and are secured to said sides in any convenient manner, for instance by brackets 103.

Figure 10:
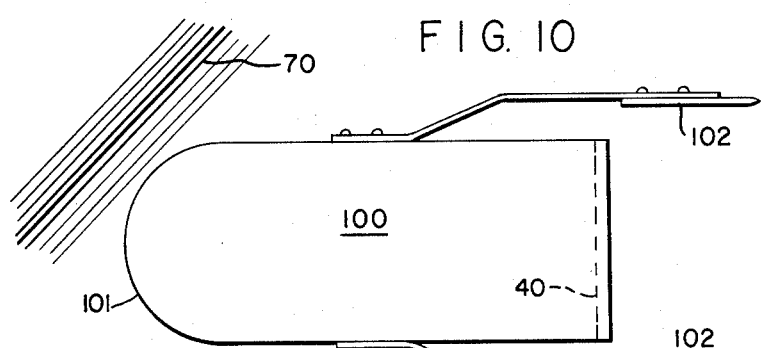
FIG. 10 is a top view of a preferred pontoon structure for supporting the basic tube elements in the modification of FIG. 8.
Figure 11:
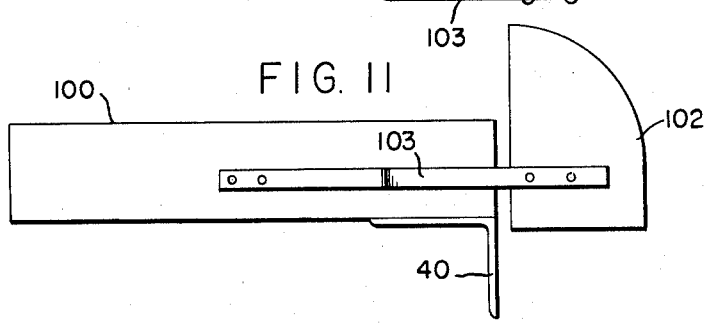
FIG. 11 is a side view of the same pontoon.

It will be recognized from FIG. 10 that when a wave approaches obliquely the horizontal axis of the pontoon, it will meet the vertical fins obliquely and exert an unbalanced pressure on them, which will produce a rectifying moment on the pontoon. No pressure will be exerted on the fins when their planes are perpendicular to the wave front, which will consequently automatically be the equilibrium position of the pontoon.

(As already mentioned, the pontoon will normally be anchored to the sea bottom, and will be furthermore provided with a stabilizing vertical plate 40.)

Since the apparatus is bound to be fixed, while the height $h$ of the waves is apt to vary from hour to hour, the value of $j$ will continually vary. If the range of variation of the waves can be estimated, it is recommended to choose $h_1$ so that $j$ will be between ¼ and ⅓ most of the time.

On the other hand, it is desirable to use as much of the width of the wave (crestwise) as possible, but it is necessary to leave space between adjacent channels to permit discharge through ports or "gills" 87. Accordingly, the design of FIGS. 12, 13 is suggested for a "mill" layout for wind waves.

100 is the body of the pontoon, having fins 102 as in FIG. 10. Placed on top of its deck are a number of rectangular tubes 81, which are about twice as wide at their mouths 82 than along their main stem. As shown in FIG. 13, the cheeks 85 come down to the bottom level almost instantly or may even dip slightly into the water. The length of this wide portion may be about 2/3 to 3/4 times the average expected value of X at level $h_1$. But from the chin 84 forward (i.e. the point where the bottom of the tube begins), the tube starts narrowing down to a uniform width for a long stretch A to provide room from the water-slug resulting from converging water.

For instance, if waves of $L=100$ to 150 feet are expected, the wide mouth portion may be 4 ft. wide and about 30 to 35 ft. long, the narrower shank portion may be 2 ft. wide and about 75 to 80 ft. long, and the horizontal portion of the compression chamber may be about 10 ft. long.

The "gills" 87 may be spaced in staggered relation to each other, to facilitate discharge into the spaces between adjacent tubes.

As a further improvement, netting material 88, of coarse mesh, may be provided to surround the open portions of the tubes 81, to prevent fish, seaweed or debris from being washed into the tube 81. (FIGS. 12 and 13.)

It will be clear that the apparatus of this invention, once installed is automatic and permanent. It consumes no manufactured power. It will require little attention or upkeep, except perhaps for replacement of pads 31 if they are found to wear out.

The apparatus described up to now is essentially a small-scale installation. It is designed principally to supply the needs of a small farmer, gardener or cattle- or poultry-raiser along the seashore. It can be adapted, however, for large-scale, industrial operation in several ways. Multiplying the number of units or extending the width of the pontoon in FIG. 12 and multiplying the number of tubes supported thereon are, obviously, immediate means available for multiplying the output. Furthermore, if desired, a bank of such units may be established in the open sea at some distance from the shore (say 500 ft. to 2 miles) to constitute a collecting field. All the water collected from the tubes may be directed by suitable piping to discharge into a central tanker or barge. And a special marine crew may be appointed to go out with tug boats daily to the field, to replace the filled tankers or barges with empty ones and to haul in the filled ones to a collecting depot near the shore line.

Other variations in detail will be readily apparent to those skilled in the art.

In Part V, an additional table is given which sets forth W and $\beta\Delta x$ as functions of $r$—wherein $r$ is the compression ratio $(v_1/v_2)$, W is the energy in joules required to compress each initial mol.-vol. of air to the stage $r$, while $\beta\Delta x$ is the quantity of water, in moles, evaporated in this process per each initial mol.-vol. of air. This table is supplementary to Tables III–3 to III–6, and can under certain conditions be used to estimate $\beta\Delta x$ directly from the total energy available in a given problem for the compression act and from the volume of air $v_1$ to which it is applied.

PART III.—FORMULAS AND TABLES (NOTE: Except for formulas which are easily recognizable as physical classics, all the formulas in this Part III have been derived theoretically or determined empirically by this inventor. Hence no literature references are given.)

III–1.—*Formulas*

ADIABATIC COMPRESSION OF AIR IN THE PRESENCE OF LIQUID WATER $pv=nRT$; $p_1$, $v_1$, $n_1$, $T_1$ = initial values
$p_2$, $v_2$, $n_2$, $T_2$ = final values.

Let $r=v_1/v_2$.

$$\frac{p_2}{p_1}=r^\alpha,\ \alpha \doteq 1.1650+\frac{0.0225}{r};\ \frac{n_2 T_2}{n_1 T_1}=r^{\alpha-1}$$

$$\frac{T_2}{T_1}=r^\beta,\ \beta=0.0009r+0.11345+\frac{0.0375}{r}$$

$$\frac{n_2}{n_1}=r^\gamma,\ \gamma=0.05155-\frac{0.0150}{r}-0.0009r$$

$n_a$ = initial moles of air in 1 mol. vol.
$x_1$ = initial moles of $H_2O$ in 1 mole. vol.
$x_2$ = final moles of $H_2O$ in 1 mol. vol.

$n_1=n_a+x_1$, $n_2=n_a+x_2$; $\Delta n=n_2-n_1=x_2-x_1=\Delta x$; $\Delta T=T_2-T_1$.

Take $p_0=1$ atm., $n_0=1$ mole, $T_0=273°$ K. Next take $p_1=p_0=1$ atm., and $n_1 T_1=273$; then, if $T_1=293°$ K., $n_1=0.9317$ mole, $n_a=0.9102$ mole, $x_1=0.0215$ mole per mol.-vol. of $v_1$.

III–2. *Formulas*

ENERGY RELATIONS $K_0$ = initial kinetic energy of projectile or slug of water hitting a volume of confined air as in FIG. 4.

$p_1$ = initial pr. = 1 atm. = $1.013 \times 10^6$ dynes $\doteq \frac{81}{80} \times 10^6$ $v_1=aB$ = initial vol. to be compressed;
$a$ = cross sectional area;

$$a=\frac{\pi\alpha^2}{4}$$

$\delta$ = density of sea water = 1.025 = 41/40.
$r=v_1/v_2$; $\beta=b/B$ (See FIG. 4.)

(NOTE: $\beta$ here is an index to the degree of compression. It should not be confused with the $\beta$ in the empirical formula for $T_2/T_1$ in III–1.)

$$r=\frac{1}{1-\beta};\ \beta=\frac{r-1}{r}$$

BASIC FORMULA $$\frac{K_0}{p_1 v_1}=\frac{r^{\alpha-1}-1}{\alpha-1}-\beta$$

If $k=\frac{A}{B}$ (See Fig. 4), $U^2=\frac{2p_1}{\delta(\beta+k)}\cdot\frac{K_0}{p_1 v_1}=\frac{81\times 10^6}{41(\beta+k)}\cdot\frac{K_0}{p_1 v_1}$ If $K_0$ is in ergs, U is expressed in cm./sec.
NOTE: 1 mi/hr. = 44.7 cm./sec.

III–3. *Table*

$P_2$, $T_2$, $n_2$, as functions of $r$. ($r=v_1/v_2$.) (Also, $\Delta T$ and $\Delta x$, when $T_1=293$, $p_1=1$ and $n_1 T_1=273$.)]

| r | $T_2$, °K. | $n_2$, moles | $p_2$, atm. | $\Delta T$, °C. | $\Delta x$, moles | $\beta$ | $\beta\Delta x$ |
|---|---|---|---|---|---|---|---|
| 0.6 | 267.4 | 0.9170 | 0.54 | −25.6 | −0.0147 | −2/3 | 0.0098 |
| 0.75 | 279.5 | 0.9227 | 0.71 | −13.5 | −0.0090 | −1/3 | 0.0030 |
| 1.0 | 293 | 0.9317 | 1.00 | 0 | 0 | 0 | 0 |
| 1.6 | 312.6 | 0.9490 | 1.74 | 19.6 | 0.0173 | 3/8 | 0.0065 |
| 2 | 321.6 | 0.9586 | 2.26 | 28.65 | 0.0269 | 1/2 | 0.0135 |
| 3 | 337.4 | 0.9759 | 3.62 | 44.7 | 0.0442 | 2/3 | 0.0295 |
| 4 | 349.3 | 0.9888 | 5.07 | 56.3 | 0.0571 | 3/4 | 0.0428 |
| 5 | 358.6 | 0.9991 | 6.57 | 65.6 | 0.0674 | 4/5 | 0.0539 |
| 6.5 | 370 | 1.0121 | 8.92 | 77 | 0.0804 | 11/13 | 0.0680 |

III-4. Table $$\left[r,\ p_2/p_1,\ n_2/n_1 \text{ and } \frac{K_0}{p_1v_1} \text{ as functions of } \beta.\ \left(\beta=\frac{r-1}{r}\right)\right]$$

| $\beta$ | $r$ | $\alpha$ | $p_2/p_1$ | $\gamma$ | $n_2/n_1$ | $K_0/p_1v_1$ |
|---|---|---|---|---|---|---|
| 0 | 1 | 1.1875 | 1 | .03565 | 1 | 0 |
| 0.1 | 10/9 | 1.1852 | 1.133 | .03705 | 1.0039 | 0.0069 |
| 0.25 | 4/3 | 1.1819 | 1.405 | .03910 | 1.0114 | 0.046 |
| 0.50 | 2 | 1.1762 | 2.260 | .04225 | 1.0297 | 0.237 |
| 0.75 | 4 | 1.1705 | 5.067 | .04420 | 1.0632 | 0.815 |
| 0.90 | 10 | 1.1672 | 14.70 | .04105 | 1.0991 | 1.905 |
| 1.0 | $\infty$ | 1.1650 | $\infty$ | | | |

III-5. Table

[$n_2, x_2, \Delta x$ and $\beta\Delta x$ as functions of $\beta$, when $T_1=293$, $p_1=1$ and $n_1=0.9317$ (i.e. $n_1T_1=273$)]

| $\beta$ | 0 | 0.1 | 0.25 | 0.50 | 0.75 | 0.9 |
|---|---|---|---|---|---|---|
| $n_2$ | 0.9317 | 0.9354 | 0.9423 | 0.9594 | 0.9906 | 1.0241 |
| $x_2$ | 0.0215 | 0.0252 | 0.0321 | 0.0492 | 0.0804 | 0.1139 |
| $\Delta x$ | 0 | 0.0037 | 0.0106 | 0.0277 | 0.0589 | 0.0924 |
| $\beta\Delta x$ | 0 | 0.00037 | 0.00265 | 0.01385 | 0.0442 | 0.0832 |

III-6. Table

U plotted ag. $\beta$ for various values of $k$. (U stated in mi./hr.) [$k=A/B$]

| $\beta$ | 0.1 | 0.25 | 0.50 | 0.75 | 0.90 |
|---|---|---|---|---|---|
| U | 8.25 | 13.5 | 21.6 | 32.7 | 45.7 in mi./hr. when $k=0$. |
| | 1.287 | 3.28 | 7.20 | 13.0 | 19.6 in mi./hr. when $k=4$. |
| | 1.155 | 2.94 | 6.50 | 11.8 | 17.85 in mi./hr. when $k=5$. |
| | 1.055 | 2.70 | 5.99 | 10.9 | 16.5 in mi./hr. when $k=6$. |

Graphs corresponding to these tables are given in FIG. 14.

III-7. Formulas, Miscellaneous (A) YIELD OF WATER PER WAVE-BLOW $\theta$=coefficient of recovery.
$z$=total quantity recovered in one wave.

$$z=\theta\beta\Delta x\cdot v_1=\theta\beta\Delta x\frac{aB\times 28,300}{22,400}\text{moles}$$

(To obtain $z$ in cc., multiply by 18.)

(B) DIMENSIONAL RELATIONS $L_1$=length of horizontal thru wave at level $h_1$;
$A$=length of water-slug $$L_1=\frac{\theta L}{\pi}$$

where $\cos\theta=2j-1$, and $j=h_1/h$;
If tube is long enough, $$A=\frac{S}{jh}=\frac{LF}{2\pi j}$$

where $F=\sin\theta-\theta\cos\theta$.
(Otherwise, A is length of the tube to the left of zero.)

III-8. Table

| $j$ | $\cos\theta$ | $\theta$ | F | $L_1$ | A |
|---|---|---|---|---|---|
| 1/2 | 0 | $\pi/2$ | 1 | L/2 | {L/$\pi$ / 0.318L} |
| 1/3 | −1/3 | 1.91 | 1.580 | 0.608L | 0.755L |
| 1/4 | −1/2 | ⅔$\pi$ | 1.913 | ⅔L | 1.217L |

III-9. Formulas for Wind-Wave and Equivalent A and U

Assuming true sine shape. $h$=height, L=length (see FIG. 8).

$S$=total area of vertical cross-section of wave.
$s$=area of cap above level $h_1$.
$P_0$=potential energy of wave per unit width (crestwise) (treating wave as if it were a static body of water).

$P_1$=potential energy of cap above level $h_1$ (for unit width).
$A$=length of water-slug in channel containing all the water from cap $s$.
$K_0$=kinetic energy of water-slug.
$U$=ultimate velocity attained by water-slug.

Let $j=h_1/h$. Compute $\theta$ and $\sin\theta$ where $\cos\theta=2j-1$.
Compute: $F=\sin\theta-\theta\cos\theta$, $$G=\left(\frac{3}{8}-j^2\right)\theta+\frac{1}{2}\sin\theta+\frac{1}{16}\sin 2\theta$$

Then, $S=\frac{1}{2}Lh$, $$S=\frac{1}{2\pi}LhF$$

$A=s/h$, $P_0=\frac{3}{16}\delta gLh^{2*}$, $$P_1=\frac{1}{2\pi}\delta gLh^2 G$$

---

*Big. and Ed. (p. 100) give $P_0=\frac{1}{8}\delta gLH^2$. Discrepancy has plausible explanation, and will not in any event affect J, but may necessitate applying to U the factor $\sqrt{2/3}\doteq 0.8165$.

$U^2=2ghG/F$.

Let $J=P_1/P_0$. When $j=\frac{1}{4}$, $J=0.878$; $j=\frac{1}{3}$, $J=0.795$; $j=\frac{1}{2}$, $J=0.590$.

$G/F$ is essentially constant in region $j=\frac{1}{4}$ to $j=\frac{1}{2}$; then $U^2=1380h$ (wherein $h$ is to be expressed in cm., and U is obtained in cm./sec. To obtain U in mi./hr., divide by 44.7).

PART IV.—COMPUTATIONS (1) From classical adiabatics, $$\frac{T_2}{T_1}=\left(\frac{v_1}{v_2}\right)^{\gamma-1}=\left(\frac{v_1}{v_2}\right)^{0.4}; \text{ if } \frac{v_1}{v_2}=3,\ T_2=1.552T_1$$

if $t_1=20°$ C., $T_1=293$, and $T_2=388$; $\therefore t_2=115°$ C.
If $$\frac{v_1}{v_2}=5$$

$T_2=1.904T_1$; if $T_1=293$, $T_2=558$; $t_2=285°$ C.

(2) See Table III-3.

(3)
$$30.48^3\doteq 28,300;$$
$$\frac{28.3\times 28,300}{22,400}\doteq 36$$

(4)
$0.0657-0.0215=0.0442$; $.0442\times 36\times 18=28.6$;
$0.0889-0.0215=0.0674$; $0.0674\times 36\times 18=43.6$ (5)
$$K_0=\tfrac{1}{2}mU^2;\ m=\delta v_1;$$

$$\delta=\frac{41}{40}$$

$v_1=\frac{9\pi}{4}\times 30 \text{ ft.}^3=\frac{9\pi\times 30}{4}\times 28,300 \text{ cc.},\ m=6.16\times 10^6 \text{ gm.}$ $U=8 \text{ mi./hr.}=\frac{8\times 5280}{3600}$ ft./sec.

$$=\frac{176}{15}\times 30.5 \text{ cm./sec.}=358 \text{ cm./sec.}$$

$\tfrac{1}{2}mU^2=\tfrac{1}{2}\times 6.16\times 10^6\times 3.58^2\times 10^4=39.4\times 10^{10}$ ergs (6)
$$W=p_1v_1\log r,\ (r=v_1/v_2);$$

$\frac{p_2}{p_1}=r^\gamma$, $\gamma=1.4$; $\log\frac{p_2}{p_1}=\gamma\log r$ $\therefore\log\frac{p_2}{p_1}=1.4\frac{W}{p_1v_1}$ if $W=K_0$, and if $K_0=\tfrac{1}{2}mU^2=\tfrac{1}{2}\delta v_1U^2$, $$\frac{W}{p_1v_1}=\frac{\delta U^2}{2p_1};\ \delta=\frac{41}{40},\ p_1\doteq\frac{81}{80}\times 10^6$$

if $U = 358$ cm./sec., $U^2 = 0.128 \times 10^6$;

$$\frac{W}{p_1 v_1} = \frac{41 \times 0.128}{81} = 0.0648; \therefore \log_e \frac{p_2}{p_1} = 1.4 \times 0.0648 = 0.0906$$

$p_2/p_1 = 1.095$; if $p_1 = 1$ atm., $p_2 = 1.095$ atm.

(7) (See Formulas III-7a). Here, $A=30$, $B=5$; $k=6$. From graph III-10 or Table III-5, when $k=6$ and $U=8$, $\beta \doteq 6.2$; $\beta \Delta x \doteq 0.024$;

$$v_1 = \frac{9\pi}{4} \times 5 \times \frac{28,300}{22,400} \text{mol. vol.} = 44.7 \text{ m.v.}$$

Assuming $\theta = 0.80$, $z = 0.80 \times 44.7 \times 0.024 = 0.86$ mole of $H_2O \doteq 15.5$ cc.

(8)

$$8 \times 60 \times 16 = 7680 \text{ waves per day;}$$

$$\frac{7680 \times 15.5}{1000} = 119 \text{ lit.}$$

(9)

1 gal. $\doteq$ 3.786 liters

PART V.—ENERGY TABLE $r = v_1/v_2$
$W$ = energy applied, in joules
$\beta \Delta x$ = water evaporated, in moles
} per initial mol.-vol. of air

| r | β | W | βΔx | dW/dr | $\frac{d(\beta \Delta x)}{dr}$ |
|---|---|---|---|---|---|
| 1 | 0 | 0 | 0 | 2,270 | 0 |
| 1.6 | 3/8 | 1,111 | 0.0065 | 1,543 | 0.0116 |
| 2 | 1/2 | 1,671 | 0.0135 | 1,282 | 0.0135 |
| 3 | 2/3 | 2,740 | 0.0295 | 915 | 0.0129 |
| 4 | 3/4 | 3,550 | 0.0428 | 719 | 0.0109 |
| 5 | 4/5 | 4,188 | 0.0539 | 596 | 0.0092 |
| 6.5 | 11/13 | 4,991 | 0.0680 | 479 | 0.0073 |

I claim as my invention:

1. A process of producing fresh water, which comprises
   (1) diverting a mass of water from a sea wave into a confined hollow space while simultaneously transforming into kinetic energy the sum of potential and kinetic energies which said mass of water possessed while it was part of said sea wave,
   (2) directing said diverted water and kinetic energy against a volume of air contained within a confined space whereby to trap said air within a thermally insulated portion of said space and to compress it adiabatically, in direct contact with said mass of water, at the expense of the kinetic energy of said mass,
   (3) securing the greater part of said compressed air against rearward expansion after the instant when said mass of water has spent all its kinetic energy, then
   (4) expanding a portion of the compressed air through a throttle into a zone of lesser pressure, and
   (5) collecting the moisture which is precipitated near the throttle.

2. A method of producing fresh water, which comprises diverting a portion of the water of a sea wave together with a portion of the energy of said sea wave into a confined oblong chamber which is closed at the far end and is heat insulated along at least the last third of its length, said diverted portion of water being of sufficient volume to fill the transverse inner area of said chamber whereby to trap within said chamber a volume of air and to compress it adiabatically to at least ⅓ of its initial volume as the diverted water moves toward the closed end of said chamber, said sea water and air being in direct contact with each other throughout said motion and compression, transferring the bulk of said compressed air through a one-way passage into an adjoining temporary retaining chamber, permitting said compressed air to escape from said temporary retaining chamber through a pressure reducing valve, and collecting the moisture which precipitates from the air as it expands through said pressure reducing valve.

3. A process of producing fresh water, which comprises compressing adiabatically a confined volume of air by the aid of energy coming solely from a moving mass of water diverted from a sea wave, said confined air being in direct contact with said mass of water throughout the process of compression, and said compression being carried on until the confined air is compressed to between ⅓ and ⅙ of its initial volume whereby to raise substantially the temperature and vapor content of said confined air, transferring the greater portion of said compressed air through a one-way valve into a temporary retaining chamber, and letting at least part of the compressed air out of said retaining chamber through a narrow passage into a zone of lower pressure, whereby the air becomes cooled and precipitates in liquid form part of the excess moisture picked up by it on compression.

4. A process as in claim 3, wherein the compressed air in the retaining chamber is let out into a zone of substantially atmospheric pressure.

5. A process as in claim 3, wherein the energy for compression is applied in the form of a water hammer created by diverting from a sea wave into a hollow oblong chamber a mass of water possessing substantial kinetic energy, said oblong chamber being closed at the opposite end, being heat-insulated for a portion of its length from said closed end rearward, and containing a side opening in the half thereof nearest to said closed end but at a considerable distance from said end, said side opening permitting air to escape from said oblong chamber as the mass of water moves toward said closed end but becoming automatically closed by the passage of said mass of water, all to the effect that said mass of water can move without substantial loss of kinetic energy until it reaches and passes said side opening but cuts off by its passage the escape of air through said opening, the mass of air in the remaining volume of said oblong chamber becoming then trapped and undergoing compression under the continued movement of said mass of water until all the kinetic energy of said mass of water has become spent.

6. An apparatus for producing fresh water from the sea, comprising
   (1) a tube of substantial length supported in an essentially horizontal position on the surface of the sea in a direction adapted to intercept a portion of the waves on said surface, said tube being open at the end which intercepts said waves and closed, except for a one-way valve, at the opposite end thereof, said tube being provided with a lateral opening in the half of its length which is nearest to said closed end, and being provided with means for closing said lateral opening automatically in response to the passage near said lateral opening of a slug of water inside the tube from the open end toward said closed end, whereby said moving slug of water will exert a water-hammer action on the volume of air trapped in the space between said lateral opening and said closed end, and
   (2) a retaining chamber contiguous to said tube near the closed end thereof and communicating with said tube through said one-way valve, whereby air compressed by said water-hammer action may pass from said tube into said retaining chamber, but may not pass back into said tube when the pressure in the latter drops.

7. An apparatus as in claim 6, said retaining chamber being provided with a throttled outlet leading into open space outside said first mentioned tube and retaining chamber and with means beyond said throttle outlet for collecting moisture which precipitates as a result of decompression, beyond said throttle.

8. As an element in an apparatus for producing fresh water from the sea, a tube of substantial length supported in an essentially horizontal position on the surface of the sea in a direction adapted to intercept a portion of the waves on said surface, said tube being open at the end which intercepts said waves and closed at the opposite end thereof except for a one-way valve situated near said closed end and directed to permit the escape of compressed air from said tube when the pressure thereof exceeds a predetermined value but not to let any of the escaped air to return into said tube when the pressure in the latter drops below said predetermined value, said tube being provided with a lateral opening in the half of its length which is nearest to said closed end, and being provided with means for closing said lateral opening automatically in response to the passage near said lateral opening of a slug of water inside the tube from the open end toward said closed end, whereby said moving slug of water will exert a water-hammer action on the volume of air trapped in the space between said lateral opening and said closed end.

References Cited in the file of this patent

UNITED STATES PATENTS

| | | |
|---|---|---|
| 575,714 | Heinzerling | Jan. 26, 1897 |
| 845,214 | Bazin | Feb. 26, 1907 |
| 1,175,287 | Olmsted | Mar. 14, 1916 |
| 1,544,130 | Christensen | June 30, 1925 |
| 2,803,591 | Coanda | Aug. 20, 1957 |

FOREIGN PATENTS

| | | |
|---|---|---|
| 633,983 | Great Britain | Dec. 30, 1949 |